(12) United States Patent
Yuan

(10) Patent No.: US 12,109,953 B2
(45) Date of Patent: Oct. 8, 2024

(54) VEHICLE-MOUNTED LOCAL NETWORK SYSTEM

(71) Applicant: HEFEI ONELINK ELECTRIC TECH. CO, LTD, Anhui (CN)

(72) Inventor: Tinghua Yuan, Anhui (CN)

(73) Assignee: HEFEI ONELINK ELECTRIC TECH. CO, LTD, Anhui (CN)

( * ) Notice: Subject to any disclaimer, the term of this patent is extended or adjusted under 35 U.S.C. 154(b) by 863 days.

(21) Appl. No.: 17/281,265

(22) PCT Filed: Sep. 24, 2019

(86) PCT No.: PCT/CN2019/107410
§ 371 (c)(1),
(2) Date: Oct. 26, 2021

(87) PCT Pub. No.: WO2020/063556
PCT Pub. Date: Apr. 2, 2020

(65) Prior Publication Data
US 2022/0219626 A1 Jul. 14, 2022

(30) Foreign Application Priority Data
Sep. 30, 2018 (CN) .......................... 201811153092.1

(51) Int. Cl.
*B60R 16/02* (2006.01)
*B60R 16/023* (2006.01)
*B60R 16/03* (2006.01)

(52) U.S. Cl.
CPC ........ *B60R 16/0215* (2013.01); *B60R 16/023* (2013.01); *B60R 16/03* (2013.01)

(58) Field of Classification Search
CPC .... B60R 16/0215; B60R 16/023; B60R 16/03
(Continued)

(56) References Cited

U.S. PATENT DOCUMENTS 8,212,571 B2 * 7/2012 Emori ................... H02J 7/0018
324/522
10,471,912 B2 * 11/2019 Ishibashi ................ B60R 16/03
(Continued)

FOREIGN PATENT DOCUMENTS

| CN | 103732450 | 4/2014 |
| CN | 104908682 | 9/2015 |

(Continued)

OTHER PUBLICATIONS

"Office Action of Japan Counterpart Application", issued on Dec. 6, 2022, p. 1-p. 6.
(Continued)

*Primary Examiner* — Alfonso Perez Borroto
(74) *Attorney, Agent, or Firm* — JCIP GLOBAL INC.

(57) ABSTRACT

A vehicle-mounted local network system, comprising a main control unit, a hybrid cable, and several intelligent electrical terminals. The hybrid cable has a built-in power line for power transmission and a signal line for signal transmission; several intelligent electrical terminals are all connected to the hybrid cable, and are connected to the main control unit through the hybrid cable; the vehicle-mounted local network system can quickly connect the main control unit and several intelligent electrical terminals through one integrated hybrid cable, thereby forming a simple, high-performance and low-cost local vehicle-mounted network system.

8 Claims, 5 Drawing Sheets

(58) Field of Classification Search
USPC .................................................. 307/10.1
See application file for complete search history.

(56) References Cited

U.S. PATENT DOCUMENTS

| | | | | |
|---|---|---|---|---|
| 2015/0349471 | A1* | 12/2015 | Maki | B60R 16/0215 307/10.1 |
| 2015/0360627 | A1* | 12/2015 | Sasaki | B60R 16/0207 174/72 A |
| 2016/0159297 | A1* | 6/2016 | Aoki | B60R 16/03 174/72 A |
| 2016/0159299 | A1* | 6/2016 | Aoki | B60R 16/03 307/10.1 |
| 2018/0334117 | A1* | 11/2018 | Matsunaga | B60R 16/0207 |
| 2019/0173240 | A1* | 6/2019 | Nakamura | B60R 16/0238 |

FOREIGN PATENT DOCUMENTS

| | | |
|---|---|---|
| CN | 105322316 | 2/2016 |
| CN | 108122629 | 6/2018 |
| CN | 109017626 | 12/2018 |
| CN | 208978780 | 6/2019 |
| JP | 2004268630 | 9/2004 |
| JP | 2013010462 | 1/2013 |
| JP | 2015058767 | 3/2015 |
| JP | 2016004686 | 1/2016 |
| WO | 2012086624 | 6/2012 |
| WO | 2015041277 | 3/2015 |

OTHER PUBLICATIONS

"Office Action of Korea Counterpart Application", issued on Feb. 13, 2023, p. 1-p. 3.

"International Search Report (Form PCT/ISA/210) of PCT/CN2019/107410", mailed on Dec. 18, 2019, with English translation thereof, pp. 1-6.

* cited by examiner

VEHICLE-MOUNTED LOCAL NETWORK SYSTEM

CROSS-REFERENCE TO RELATED APPLICATION

This application is a 371 of international application of PCT application serial no. PCT/CN2019/107410, filed on Sep. 24, 2019, which claims the priority benefits of China Patent Application No. 201811153092.1, filed on Sep. 30, 2018. The entirety of each of the above mentioned patent applications is hereby incorporated by reference herein and made a part of this specification.

BACKGROUND

Technical Field

The disclosure relates to an automotive electronic system field, and in particular, to a vehicle-mounted local network system.

Description of Related Art

At present, in the automotive electrical control systems, the bus-type automotive electrical control systems are adopted most of the time (mostly the CAN bus control systems at present), and bus information is used to be associated with electrical logic and control logic. In this way, the wiring and control logic of conventional electrical appliances are reduced, the reliability of the systems is improved, and the informatization of the car body is easily realized. However, the wiring connection of the bus-type automobile electrical systems is still excessively complicated, and the system costs are high as well. Since the bus-type automobile electrical system has high requirements for the reliability of the control unit, the performance of the control module housing, and the performance of the connector, costs increase as a result. On the other hand, in order to reduce the costs of the control unit, one control unit is often associated with more electrical appliances. As such, the reliability of the control unit is low, and manufacturing of the wiring harness of the connector is complicated.

Regarding the disclosed patented technology with the published patent number CN 104908682A, although the control driving unit is moved to the local electrical appliance, the wiring harness and the connector are still in the conventional mode, manufacturing of the wiring harness is complicated, and low reliability is provided.

Technical Problem

The disclosure provides a vehicle-mounted local network system through which a main control unit and intelligent electrical terminals are quickly connected through one integrated hybrid cable, and a simple, high-performance, and low-cost local vehicle-mounted network system is thereby formed.

SUMMARY

The disclosure includes the following technical solutions.

A vehicle-mounted local network system is provided and includes a main control unit, a hybrid cable, and a plurality of intelligent electrical terminals. The hybrid cable has a built-in power line for power transmission and a signal line for signal transmission, and the intelligent electrical terminals are all connected to the hybrid cable and are quickly connected to the main control unit through one integrated hybrid cable to form a convenient local vehicle-mounted network system.

The hybrid cable includes a main hybrid cable and a plurality of branch hybrid cables. The main hybrid cable is connected to the main control unit, and both the main hybrid cable and the branch hybrid cables are connected with corresponding intelligent electrical terminals. Each of the branch hybrid cables is connected to the main hybrid cable through a corresponding transfer terminal, and the transfer terminal correspondingly connects a power line of the main hybrid cable and a power line of the branch hybrid cable and connects a signal line of the main hybrid cable and a signal line of the branch hybrid cable.

The main control unit comprises a logic control unit, a power management unit, a current sensor, a power protection component, a hybrid wire clamping connector, a power port, and a bus port. The power protection component and the current sensor are connected in series between the power port and a power electrode of the hybrid wire clamping connector. The power protection component and a signal terminal of the current sensor are both connected to the power management unit, and the power management unit, a signal electrode of the hybrid wire clamping connector, and the bus port are all connected to the logic control unit.

The intelligent electrical terminals include an integrated intelligent electrical terminal, a connected intelligent electrical terminal, and a multiple intelligent electrical terminal. The integrated intelligent electrical terminal is integrally formed by a local electrical appliance and the hybrid wire clamping connector. The connected intelligent electrical terminal is formed by connecting one local electrical appliance with the hybrid wire clamping connector. The multiple intelligent electrical terminal is formed by connecting a plurality of local electrical appliances with the hybrid wire clamping connector, and the local electrical appliances are connected onto the hybrid cable through the corresponding hybrid wire clamping connector. The hybrid cable includes a power copper strip, a signal copper strip, an insulating soft rubber layer wrapped around the power copper strip and the signal copper strip, and a protective layer wrapped around the insulating soft rubber layer. A row of connecting windows are sequentially arranged on the protective layer in a conduction direction of the hybrid cable, and the insulating soft rubber layer fills the connecting windows.

The transfer terminal is one integrated component containing two hybrid wire clamping connectors. One hybrid wire clamping connector is connected to the main hybrid cable, and the other hybrid wire clamping connector is connected to the branch hybrid cables. Power electrodes between the two hybrid wire clamping connectors are correspondingly connected, and signal electrodes between the two hybrid wire clamping connectors are correspondingly connected.

The hybrid cable includes one power copper strip and two signal copper strips tightly attached to an outer wall of the power copper strip through an insulating strip.

A cross section of the hybrid cable is rectangular, and a row of connection windows are sequentially arranged on one of side walls of the protective layer of the hybrid cable in the conduction direction of the hybrid cable. Cross sections of the power copper strip and the signal copper strips are both rectangular. One side surface of the power copper strip is opposite to the connection windows, and among the remaining three side surfaces of the power copper strip, two opposite side surfaces are closely attached to the corresponding signal copper strips.

The hybrid wire clamping connector includes a connector and a lock beam connected to each other, a local micro-control unit disposed on the connector, two signal electrode pins, and two power electrode pins. Both the two signal electrode pins and the two power electrode pins are connected to the local micro-control unit, and the local electrical appliance is connected to the local micro-control unit corresponding to the hybrid wire clamping connector. Inner ends of the two signal electrode pins and the two power electrode pins are both fixed onto the connector, and outer ends of two signal electrode pins and the two power electrode pins face the lock beam. The connector is provided with two guiding arms facing the lock beam and two upper clamping arms located outside the corresponding guiding arms, and the two signal electrode pins and the two power electrode pins are both located between the two guiding arms. The lock beam is provided with two lower clamping arms and two clamping beam shoulders facing the connector, and the two clamping beam shoulders are both disposed between the two lower clamping arms. When the connector and the lock beam are connected, the two upper clamping arms extend into inner sides of the corresponding lower clamping arms, and the upper clamping arms and the corresponding lower clamping arms are engaged with each other. The two guiding arms extend into inner sides of the corresponding clamping beam shoulders, and outer side walls of the guiding arms closely contact inner side walls of the corresponding clamping beam shoulders. When the hybrid wire clamping connector and the hybrid cable are connected, the two signal electrode pins and the two power electrode pins on the hybrid wire clamping connector penetrate into the insulating soft rubber layer from one corresponding connecting window on the hybrid cable. The two power electrode pins are located on a periphery of the power copper strip and contact and are connected to the power copper strip, and the two signal electrode pins are located outside the two signal copper strips and contact and are connected to the corresponding signal copper strips.

Effects of Disclosure

The disclosure includes the following advantages.

(1) The local electrical appliances, the wiring harness, and the control unit provided by the disclosure are comprehensively designed, connection between several intelligent electrical terminals and the main control unit is implemented through the use of one integrated hybrid cable, and the vehicle-mounted local network system is thereby formed.

(2) The main control unit provided by the disclosure is mainly used for signal transmission and power transferring and does not directly control the power components of the vehicle body electrical appliances. Therefore, the heating and the external volume of the main control unit are greatly reduced, the reliability is significantly improved, and the costs are considerably lowered.

(3) In the disclosure, since the local electrical appliance is driven by the local micro-control unit on the corresponding hybrid wire clamping connector, the control circuits are considerably dispersed and less associated, and the reliability of the control system and the flexibility of design are thereby improved.

(4) The hybrid wire clamping connector provided by the disclosure has a simple structure and may be convenient used, so local electrical appliances and control units may conveniently and quickly connect the hybrid cable to realize power and communication connection.

To sum up, the disclosure provides a simple, highly-reliable, and low-cost structure, and at the same time, reduces the installation costs in the production process of the automobile electrical system and the automobile after-sales service maintenance costs.

DESCRIPTION OF THE EMBODIMENTS

Description will now be made in detail to clearly and completely present preferred embodiments of the disclosure, examples of which are illustrated in the accompanying drawings. Nevertheless, the disclosed embodiments are merely part of the embodiments of the disclosure, not all the embodiments. Based on the embodiments of the disclosure, all other embodiments obtained by a person of ordinary skill in the art without making any inventive effort fall within the scope that the disclosure seeks to protect.

Figure 1:
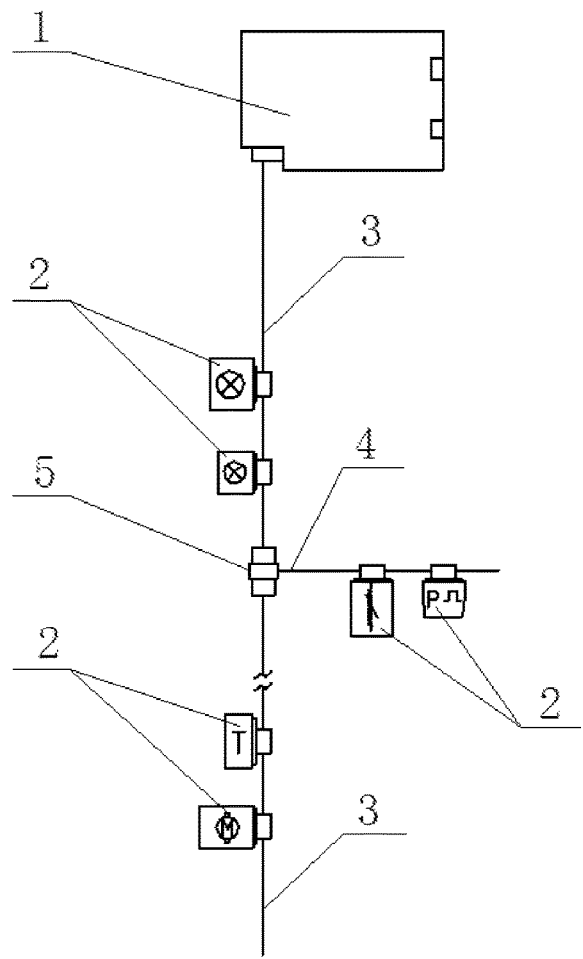
FIG. 1 is a structural schematic view according to the disclosure.

With reference to FIG. 1, a vehicle-mounted local network system includes a main control unit 1, a hybrid cable, and a plurality of intelligent electrical terminals 2. The hybrid cable has a built-in power line for power transmission and a signal line for signal transmission. The intelligent electrical terminals 2 are all connected to the hybrid cable and are connected to the main control unit 1 through the hybrid cable. Herein, the hybrid cable includes a main hybrid cable 3 and a plurality of branch hybrid cables 4, the main hybrid cable is connected to the main control unit, and both the main hybrid cable and the branch hybrid cables are connected with corresponding intelligent electrical terminals. Each of the branch hybrid cables 4 is connected to the main hybrid cable 3 through a corresponding transfer terminal 5, the transfer terminal 5 correspondingly connects a power line of the main hybrid cable 3 and a power line of the branch hybrid cable 4 and connects a signal line of the main hybrid cable 3 and a signal line of the branch hybrid cable 4.

Figure 2:
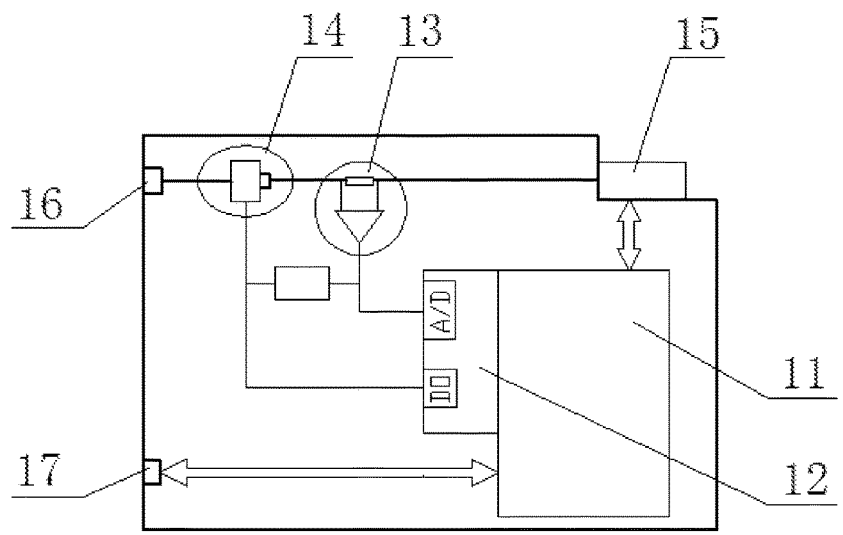
FIG. 2 is a structural schematic view of a control unit according to the disclosure.

With reference to FIG. 2, the main control unit 1 includes a logic control unit 11, a power management unit 12, a current sensor 13, a power protection component—MOSFET transistor 14, a hybrid wire clamping connector 15, a power port 16, and a bus port 17. The power protection component—MOSFET transistor 14 and the current sensor 13 are connected in series between the power port 16 and a power electrode in the hybrid wire clamping connector 15. A control terminal of the power protection component—MOSFET transistor 14 is connected to a DO port of the power management unit 12, and an output terminal of the current sensor 13 is connected to an AD conversion port of the power management unit 12. The power management unit 12, a signal electrode of the hybrid wire clamping connector 15, and the bus port 17 are all connected to the logic control unit 11. The logic control unit 11 may manage and control the intelligent electrical terminals connected onto the hybrid cable through the hybrid wire clamping connector 15. The power management unit 12 may control turning on/off of the power protection component—MOSFET transistor 14 through detecting a current value of the current sensor 13. When a working state of each local electrical appliance on the hybrid cable connected to the hybrid wire clamping connector 15 remains unchanged (that is, the local electrical appliance is always in a stable working state when it is in a turning on state or in a standby state when power is off), a working current value on the hybrid cable exhibits a small change at this time. When a comparison result of a working current value detected by the current sensor 13 and a sum of rated current values of the connected intelligent electrical terminals stored by the power management unit 12 has a large deviation, it is an abnormal state. When the detected current value is excessively large, it may that the hybrid cable is shorted to ground or an intelligent electrical terminal on the hybrid cable is shorted to ground. In the former state (the hybrid cable is shorted to ground), the power management unit 12 controls the power protection component—MOSFET transistor 14 to turn off power, and in the latter state (an intelligent electrical terminal on the hybrid cable is shorted to ground), the main control unit sends a command through the hybrid cable to control the intelligent electrical terminal to turn off power. When disconnecting power supply, the power protection component—MOSFET transistor 14 or the intelligent electrical terminal uploads fault information at the same time. When the local electrical appliance is turned off or disconnected, a working current on the hybrid cable changes accordingly. When a current change amount collected by the current sensor 13 is significantly different from a rated current change amount, the main control unit controls the intelligent electrical terminal to disconnect the power supply and upload the fault information.

Herein, the transfer terminal 5 is one integrated component containing two hybrid wire clamping connectors 6. One hybrid wire clamping connector 6 is connected to the main hybrid cable, the other hybrid wire clamping connector 6 is connected to the branch hybrid cables 4, and power electrodes and signal electrodes between the two hybrid wire clamping connectors 6 are correspondingly connected. In engineering applications, the transfer terminal 5 may add other auxiliary functions to effectively monitor and protect the branch hybrid cables 4. For instance, a fuse (or an intelligent power device with power protection function) may be added between the power line of the main hybrid cable 3 and the power lines of the branch hybrid cables 4, a filter may be added between the signal line of the main hybrid cable 3 and the signal lines of the branch hybrid cables 4, and so on.

Figure 3:
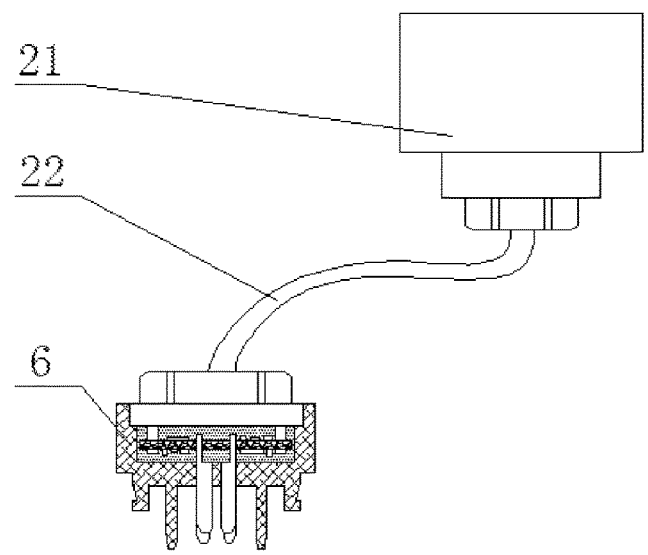
FIG. 3 is a structural schematic view of an intelligent terminal of a local electrical appliance according to the disclosure.
Figure 4:
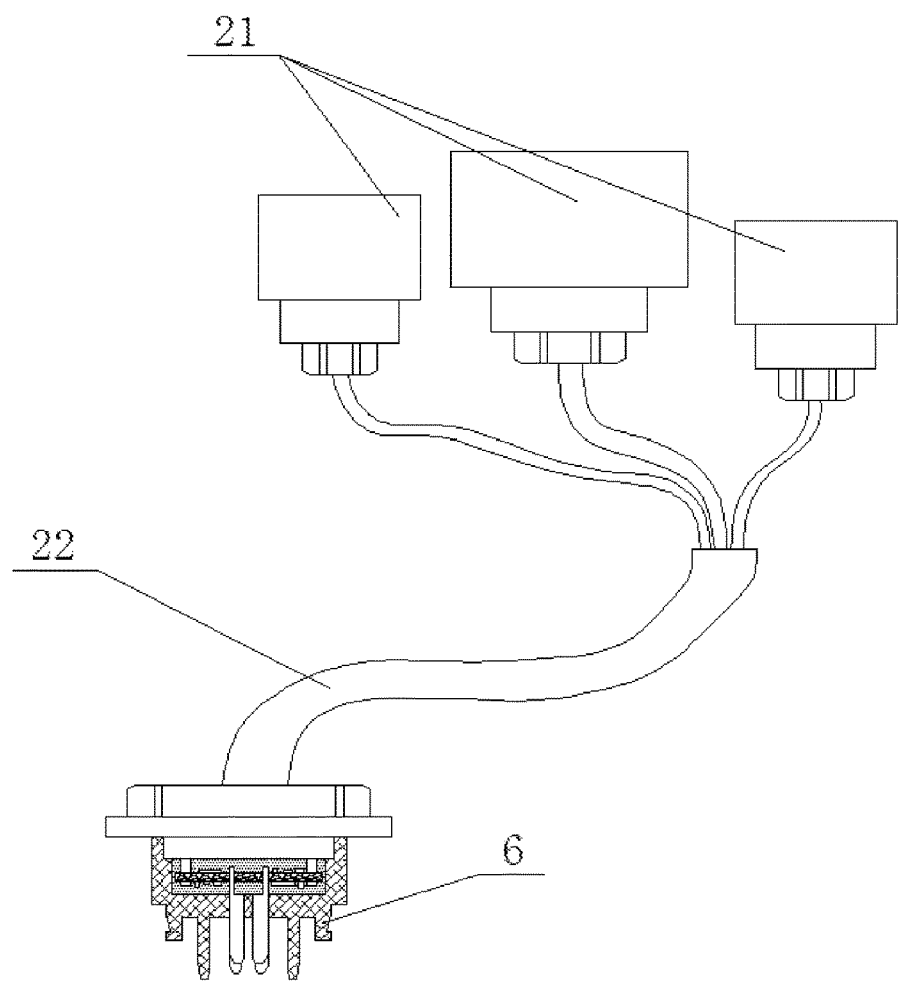
FIG. 4 is a structural schematic view of a multiple intelligent electrical terminal according to the disclosure.

The intelligent electrical terminals 2 includes an integrated intelligent electrical terminal (FIG. 8), a connected intelligent electrical terminal (FIG. 3), and a multiple intelligent electrical terminal (FIG. 4). Herein, the integrated intelligent electrical terminal is integrally formed by a local electrical appliance 21 and the hybrid wire clamping connector 6. The connected intelligent electrical terminal is formed by connecting one local electrical appliance 21 with the hybrid wire clamping connector 6 through a lead wire 22. The multiple intelligent electrical terminal is formed by connecting a plurality of local electrical appliances 21 with the hybrid wire clamping connector 6 through the lead wire 22, and the local electrical appliances 21 are connected onto the hybrid cable through the corresponding hybrid wire clamping connector 6.

The local electrical appliances include various electrical appliances, sensors, and electronic switches.

Figure 5:
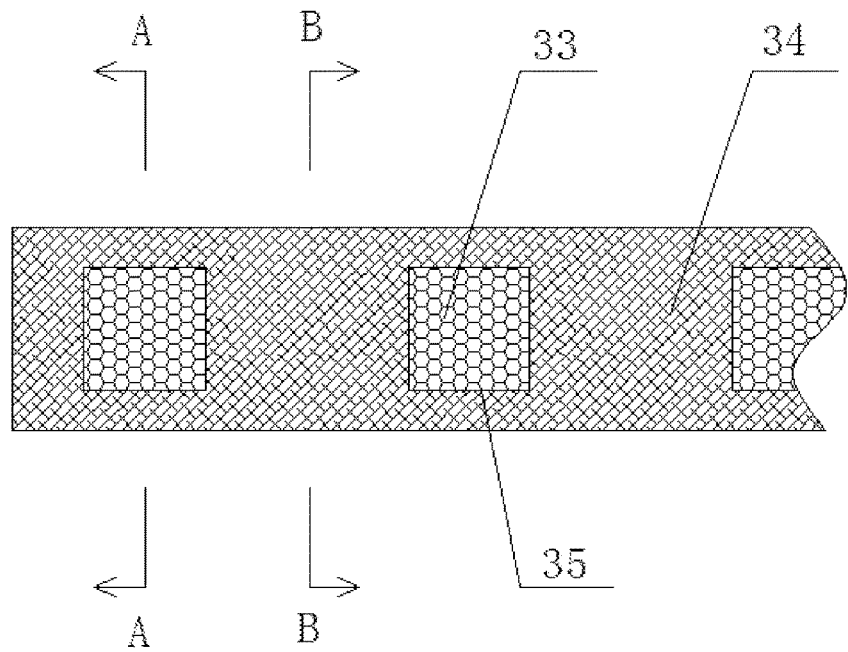
FIG. 5 is a structural schematic view of a hybrid cable according to the disclosure.
Figure 6:
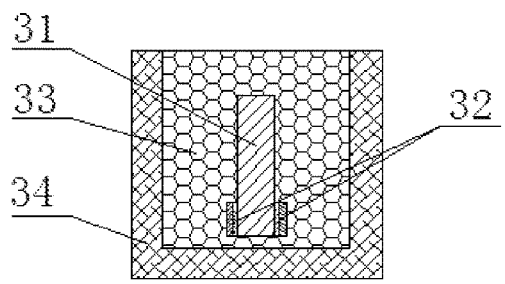
FIG. 6 is a cross-sectional view taken along a line A-A in FIG. 5.
Figure 7:
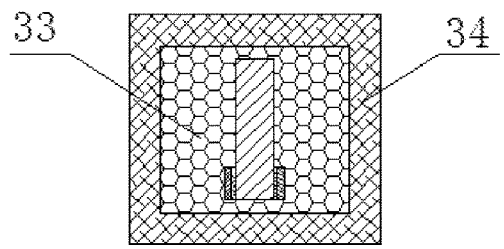
FIG. 7 is a cross-sectional view taken along a line B-B in FIG. 5.

With reference to FIG. 5 to FIG. 7, the hybrid cable (the main hybrid cable 3 and the branch hybrid cables 4) has a rectangular cross section and includes one power copper strip 31 having a rectangular cross section and two signal copper strips 32 tightly attached to an outer wall of the power copper strip 31 through an insulating strip and having rectangular cross sections, an insulating soft rubber layer 33 wrapped around the power copper strip 31 and the two signal copper strips 32, and a protective layer 34 wrapped around the insulating soft rubber layer 33. A row of connecting windows 35 are sequentially arranged on one of side walls of the protective layer 34 in a conduction direction of the hybrid cable, and the insulating soft rubber layer 33 fills the connecting windows 35. One side surface of the power copper strip 31 is opposite to the connection windows 35, and among the remaining three side surfaces of the power copper strip 31, two opposite side surfaces are closely attached to the corresponding signal copper strips 32.

Figure 8:
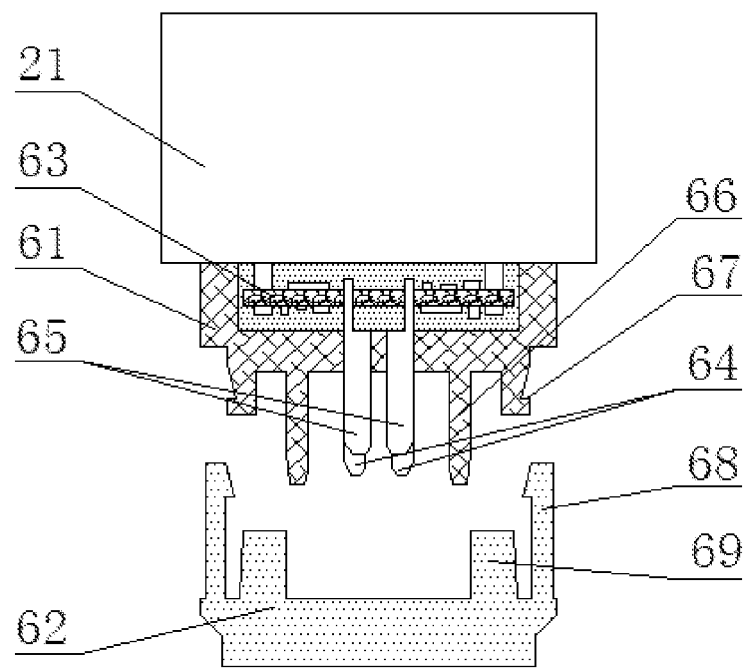
FIG. 8 is a structural schematic view of a hybrid wire clamping connector according to the disclosure.
Figure 9:
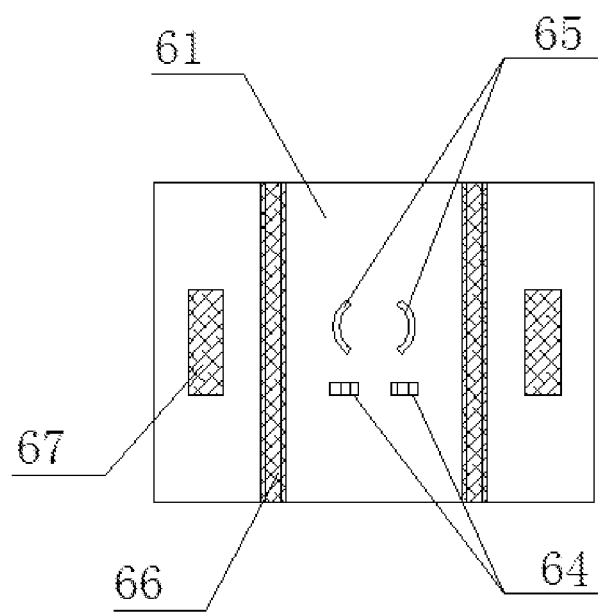
FIG. 9 is a bottom view of a portion of the connector in FIG. 8.

With reference to FIG. 8 and FIG. 9, the hybrid wire clamping connector 6 includes a connector 61 and a lock beam 62 connected to each other, a local micro-control unit 63 disposed on the connector 61, two signal electrode pins 64, and two power electrode pins 65. Both the two signal electrode pins 64 and the two power electrode pins 65 are connected to the local micro-control unit 63. The local electrical appliance 21 is connected to the local micro-control unit 63 corresponding to the hybrid wire clamping connector 6. Inner ends of the two signal electrode pins 64 and the two power electrode pins 65 are both fixed onto the connector 61. Outer ends of two signal electrode pins 64 and the two power electrode pins 65 face the lock beam 62. The connector 61 is provided with two guiding arms 66 facing the lock beam 62 and two upper clamping arms 67 located outside the corresponding guiding arms 66. The two signal electrode pins 64 and the two power electrode pins 65 are both located between the two guiding arms 66. The lock beam 62 is provided with two lower clamping arms 68 and two clamping beam shoulders 69 facing the connector 61, and the two clamping beam shoulders 69 are both disposed between the two lower clamping arms 68. When the connector 61 and the lock beam 62 are connected, the two upper clamping arms 67 extend into inner sides of the corresponding lower clamping arms 68, the upper clamping arms 67 and the corresponding lower clamping arms 68 are engaged with each other, the two guiding arms 66 extend into inner sides of the corresponding clamping beam shoulders 69, and outer side walls of the guiding arms 66 closely contact inner side walls of the corresponding clamping beam shoulders 69. Herein, the two power electrode pins 65 are two left-right symmetrical curved copper sheets provided chamfers at the bottoms, and the two signal electrode pins 64 are two left-right symmetrical pins provided with knife-edged chamfers at the bottom. When the hybrid wire clamping connector 6 and the hybrid cable are connected, the two signal electrode pins 64 and the two power electrode pins 65 on the hybrid wire clamping connector 6 penetrate into the insulating soft rubber layer 33 from one corresponding connecting window 33. As the hybrid cable is guided by the two guiding arms 66, the two signal electrode pins 64 and the two power electrode pins 65 pierce the insulating soft rubber layer 33 and smoothly enter an inner portion of the hybrid cable. When the bottom chamfers of the two power electrode pins 65 contact the power copper strip 31, a lateral force of the power copper strip 31 causes the two power electrode pins 65 to open outwards and the two power electrode pins 65 are inserted in close contact with the power copper strip 31. Finally, the two power electrode pins 65 are located on a periphery of the power copper strip 31 and contact and are connected to the power copper strip 31. Similarly, when the bottom chamfers of the two signal electrode pins 64 contact the signal copper strips 32, a lateral force of the signal copper strip 32 causes the two signal electrode pins 64 to open outwards and the two signal electrode pins 64 are inserted in close contact with the signal copper strips 32. Finally, the two signal electrode pins 64 are located outside the two signal copper strips 32 and contact and are connected to the corresponding signal copper strips 32.

Figure 10:
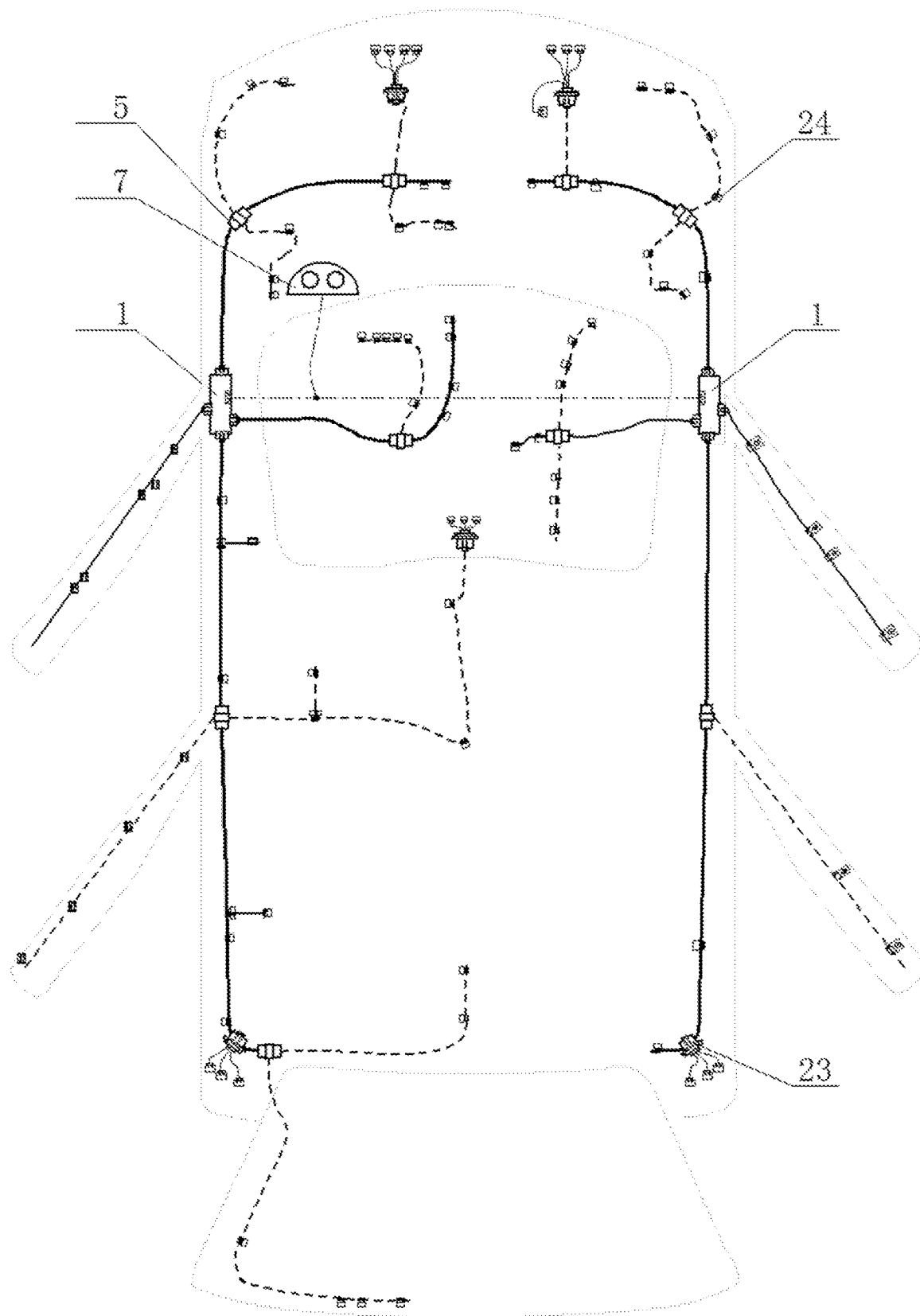
FIG. 10 is a vehicle electrical network system, where " ▬▬▬▬ " represents a main hybrid cable, " ▬ ▬ ▬ ▬ ▬ ▬ " represent a branch hybrid cable, and " ▬▬ ▬ ▬▬▬ ▬ ▬▬▬ " represents a CAN communication bus.

With reference to FIG. 10, a vehicle electrical network system includes two main control units 1, five multiple intelligent electrical terminals 23, nine transfer terminals 5, and a plurality of integrated intelligent electrical terminals 24.

With reference to FIG. 10, each of the two main control units 1 includes four hybrid wire clamping connectors exhibiting quick connection and one bus port. The four hybrid cables connected onto the four hybrid wire clamping connectors are led to a front engine compartment, an electric seat assembly, side and rear of the vehicle body, and a front door assembly. One bus port is connected to another main control unit 1 and a meter 7 through a CAN communication bus. Four multiple intelligent electrical terminal 23 are connected to front and rear lighting components, and another multiple intelligent electrical terminal 23 is connected to a wiper and a fan component. The hybrid cable introduced from the hybrid wire clamping connector may extend to one end or both ends.

Although the embodiments of the disclosure have been shown and described, a person having ordinary skill in the art can understand that various changes, modifications, substitutions, and variations may be made to these embodiments without departing from the principle and spirit of the disclosure. The scope of the disclosure is defined by the appended claims and their equivalents.

INDUSTRIAL APPLICABILITY

The disclosure provides a simple, highly-reliable, and low-cost structure, and at the same time, reduces the installation costs in the production process of the automobile electrical system and the automobile after-sales service maintenance costs and features industrial practicability.

What is claimed is:

1. A vehicle-mounted local network system, comprising a main control unit, a hybrid cable, and a plurality of intelligent electrical terminals, the hybrid cable has a built-in power line for power transmission and a signal line for signal transmission, the intelligent electrical terminals are all connected to the hybrid cable and are quickly connected to the main control unit through the hybrid cable to form a convenient local vehicle-mounted network system, wherein the main control unit comprises a logic control unit, a power management unit, a current sensor, a power protection component, a hybrid wire clamping connector, a power port, and a bus port, the power protection component and the current sensor are connected in series between the power port and a power electrode of the hybrid wire clamping connector, the power protection component and a signal terminal of the current sensor are both connected to the power management unit, and the power management unit, a signal electrode of the hybrid wire clamping connector, and the bus port are all connected to the logic control unit.

2. The vehicle-mounted local network system according to claim 1, wherein the hybrid cable comprises a main hybrid cable and a plurality of branch hybrid cables, the main hybrid cable is connected to the main control unit, both the main hybrid cable and the branch hybrid cables are connected with corresponding intelligent electrical terminals, each of the branch hybrid cables is connected to the main hybrid cable through a corresponding transfer terminal, and the transfer terminal correspondingly connects a power line of the main hybrid cable and a power line of the branch hybrid cable and connects a signal line of the main hybrid cable and a signal line of the branch hybrid cable.

3. The vehicle-mounted local network system according to claim 1, wherein the intelligent electrical terminals comprise an integrated intelligent electrical terminal, a connected intelligent electrical terminal, and a multiple intelligent electrical terminal, the integrated intelligent electrical terminal is integrally formed by a local electrical appliance and a hybrid wire clamping connector, the connected intelligent electrical terminal is formed by connecting one local electrical appliance with the hybrid wire clamping connector, the multiple intelligent electrical terminal is formed by connecting a plurality of local electrical appliances with the hybrid wire clamping connector, the local electrical appliances are connected onto the hybrid cable through the corresponding hybrid wire clamping connector, the hybrid cable comprises a power copper strip, a signal copper strip, an insulating soft rubber layer wrapped around the power copper strip and the signal copper strip, and a protective layer wrapped around the insulating soft rubber layer, a row of connecting windows are sequentially arranged on the protective layer in a conduction direction of the hybrid cable, and the insulating soft rubber layer fills the connecting windows.

4. The vehicle-mounted local network system according to claim 2, wherein the transfer terminal is one integrated component containing two hybrid wire clamping connectors, wherein one hybrid wire clamping connector is connected to the main hybrid cable, the other hybrid wire clamping connector is connected to the branch hybrid cables, power electrodes between the two hybrid wire clamping connectors are correspondingly connected, and signal electrodes between the two hybrid wire clamping connectors are correspondingly connected.

5. The vehicle-mounted local network system according to claim 3, wherein the hybrid cable comprises one power copper strip and two signal copper strips tightly attached to an outer wall of the power copper strip through an insulating strip.

6. The vehicle-mounted local network system according to claim 5, wherein a cross section of the hybrid cable is rectangular, a row of connection windows are sequentially arranged on one of side walls of the protective layer of the hybrid cable in the conduction direction of the hybrid cable, cross sections of the power copper strip and the signal copper strips are both rectangular, one side surface of the power copper strip is opposite to the connection windows, and among the remaining three side surfaces of the power copper strip, two opposite side surfaces are closely attached to the corresponding signal copper strips.

7. The vehicle-mounted local network system according to claim 3, wherein the hybrid wire clamping connector comprises a connector and a lock beam connected to each other, a local micro-control unit disposed on the connector, two signal electrode pins, and two power electrode pins, both the two signal electrode pins and the two power electrode pins are connected to the local micro-control unit, the local electrical appliance is connected to the local micro-control unit corresponding to the hybrid wire clamping connector, inner ends of the two signal electrode pins and the two power electrode pins are both fixed onto the connector, outer ends of two signal electrode pins and the two power electrode pins face the lock beam, the connector is provided with two guiding arms facing the lock beam and two upper clamping arms located outside the corresponding guiding arms, the two signal electrode pins and the two power electrode pins are both located between the two guiding arms, and the lock beam is provided with two lower clamping arms and two clamping beam shoulders facing the connector, the two clamping beam shoulders are both disposed between the two lower clamping arms, wherein when the connector and the lock beam are connected, the two upper clamping arms extend into inner sides of the corresponding lower clamping arms, the upper clamping arms and the corresponding lower clamping arms are engaged with each other, the two guiding arms extend into inner sides of the corresponding clamping beam shoulders, and outer side walls of the guiding arms closely contact inner side walls of the corresponding clamping beam shoulders, wherein when the hybrid wire clamping connector and the hybrid cable are connected, the two signal electrode pins and the two power electrode pins on the hybrid wire clamping connector penetrate into the insulating soft rubber layer from one corresponding connecting window on the hybrid cable, the two power electrode pins are located on a periphery of the power copper strip and contact and are connected to the power copper strip, and the two signal electrode pins are located outside the two signal copper strips and contact and are connected to the corresponding signal copper strips.

8. The vehicle-mounted local network system according to claim 4, wherein the hybrid wire clamping connector comprises a connector and a lock beam connected to each other, a local micro-control unit disposed on the connector, two signal electrode pins, and two power electrode pins, both the two signal electrode pins and the two power electrode pins are connected to the local micro-control unit, the local electrical appliance is connected to the local micro-control unit corresponding to the hybrid wire clamping connector, inner ends of the two signal electrode pins and the two power electrode pins are both fixed onto the connector, outer ends of two signal electrode pins and the two power electrode pins face the lock beam, the connector is provided with two guiding arms facing the lock beam and two upper clamping arms located outside the corresponding guiding arms, the two signal electrode pins and the two power electrode pins are both located between the two guiding arms, and the lock beam is provided with two lower clamping arms and two clamping beam shoulders facing the connector, the two clamping beam shoulders are both disposed between the two lower clamping arms, wherein when the connector and the lock beam are connected, the two upper clamping arms extend into inner sides of the corresponding lower clamping arms, the upper clamping arms and the corresponding lower clamping arms are engaged with each other, the two guiding arms extend into inner sides of the corresponding clamping beam shoulders, and outer side walls of the guiding arms closely contact inner side walls of the corresponding clamping beam shoulders, wherein when the hybrid wire clamping connector and the hybrid cable are connected, the two signal electrode pins and the two power electrode pins on the hybrid wire clamping connector penetrate into the insulating soft rubber layer from one corresponding connecting window on the hybrid cable, the two power electrode pins are located on a periphery of the power copper strip and contact and are connected to the power copper strip, and the two signal electrode pins are located outside the two signal copper strips and contact and are connected to the corresponding signal copper strips.

\* \* \* \* \*